US012676448B2

(12) United States Patent
Iguchi et al.

(10) Patent No.: US 12,676,448 B2
(45) Date of Patent: Jul. 7, 2026

(54) LASER DEVICE AND METHOD FOR MANUFACTURING LASER DEVICE

(71) Applicant: HAMAMATSU PHOTONICS K.K., Hamamatsu (JP)

(72) Inventors: Takuto Iguchi, Hamamatsu (JP); Yoshinori Kato, Hamamatsu (JP); Takaaki Morita, Hamamatsu (JP); Kazuki Kawai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 570 days.

(21) Appl. No.: 18/022,764

(22) PCT Filed: Aug. 19, 2021

(86) PCT No.: PCT/JP2021/030434
§ 371 (c)(1),
(2) Date: Feb. 23, 2023

(87) PCT Pub. No.: WO2022/050071
PCT Pub. Date: Mar. 10, 2022

(65) Prior Publication Data
US 2023/0318245 A1 Oct. 5, 2023

(30) Foreign Application Priority Data

Sep. 4, 2020 (JP) ................................. 2020-148901

(51) Int. Cl.
*H01S 3/02* (2006.01)
*H01S 3/04* (2006.01)
(Continued)

(52) U.S. Cl.
CPC ............ *H01S 3/025* (2013.01); *H01S 3/0407* (2013.01); *H01S 3/042* (2013.01); *H01S 3/061* (2013.01); *H01S 3/0941* (2013.01)

(58) Field of Classification Search
CPC ........ H01S 3/025; H01S 3/0941; H01S 3/042; H01S 3/0405; H01S 3/0407
See application file for complete search history.

(56) References Cited

U.S. PATENT DOCUMENTS 3,683,296 A 8/1972 Scalise
5,012,481 A 4/1991 Casteleiro
(Continued)

FOREIGN PATENT DOCUMENTS

CN 101783476 A 7/2010
CN 210517305 U 5/2020
(Continued)

OTHER PUBLICATIONS

English-language translation of International Preliminary Report on Patentability (IPRP) dated Mar. 16, 2023 that issued in WO Patent Application No. PCT/JP2021/030434.

*Primary Examiner* — Xinning(Tom) Niu
*Assistant Examiner* — Delma R Forde
(74) *Attorney, Agent, or Firm* — Faegre Drinker Biddle & Reath LLP

(57) ABSTRACT

Disclosed is a laser device includes: a rod-shaped laser medium extending in a first direction; a first light source unit including a first base and a plurality of excitation light sources; a second light source unit arranged side by side with the first light source unit in a second direction intersecting with the first direction, the second light source unit including a second base and a plurality of excitation light sources; and a holder supporting the laser medium, the first light source unit, and the second light source unit. At least one of the first base and the holder includes a first regulating part configured to regulate a position of the first base with respect to the holder, and at least one of the second base and the holder (Continued)

includes a second regulating part configured to regulate a position of the second base with respect to the holder.

10 Claims, 12 Drawing Sheets

(51) Int. Cl.
| | | |
|---|---|---|
| *H01S 3/042* | (2006.01) | |
| *H01S 3/06* | (2006.01) | |
| *H01S 3/0941* | (2006.01) | |

(56) References Cited

U.S. PATENT DOCUMENTS

| | | | |
|---|---|---|---|
| 5,251,369 A | 10/1993 | August, Jr. et al. | |
| 5,253,260 A | 10/1993 | Palombo | |
| 5,278,860 A | 1/1994 | August, Jr. et al. | |
| 5,317,590 A | 5/1994 | August, Jr. et al. | |
| 5,418,809 A | 5/1995 | August, Jr. et al. | |
| 5,475,702 A | 12/1995 | August, Jr. et al. | |
| 5,590,147 A | 12/1996 | Hobbs et al. | |
| 5,619,522 A * | 4/1997 | Dube | H01S 3/0941 |
| | | | 372/92 |
| 5,774,488 A | 6/1998 | Kmetec | |
| 6,101,208 A | 8/2000 | Gokay | |
| 2004/0136430 A1 * | 7/2004 | Tsunekane | H01S 3/025 |
| | | | 372/70 |
| 2004/0258123 A1 | 12/2004 | Zamel et al. | |
| 2006/0153258 A1 | 7/2006 | Fujikawa et al. | |

FOREIGN PATENT DOCUMENTS

| | | | | |
|---|---|---|---|---|
| JP | H1-304790 A | 12/1989 | | |
| JP | H7-115237 A | 5/1995 | | |
| JP | H07122804 B2 * | 12/1995 | | H01S 3/094 |
| JP | 2000-277837 A | 10/2000 | | |
| JP | 2001-068765 A | 3/2001 | | |
| JP | 2001-068767 A | 3/2001 | | |
| JP | 2005-285807 A | 10/2005 | | |
| JP | 2006-114677 A | 4/2006 | | |
| JP | 2015-119012 A | 6/2015 | | |
| JP | 2022-043570 A | 3/2022 | | |

* cited by examiner (a)

(b)

(a)

(b)

LASER DEVICE AND METHOD FOR MANUFACTURING LASER DEVICE

TECHNICAL FIELD

The present disclosure relates to a laser device and a method for manufacturing a laser device.

BACKGROUND ART

A laser device that includes a rod-shaped laser medium and a plurality of excitation light sources that emit excitation light for exciting the laser medium is known (see Patent Literature 1, for example).

CITATION LIST

Patent Literature

[Patent Literature 1] Japanese Unexamined Patent Publication No. 2005-285807

SUMMARY OF INVENTION

Technical Problem

A laser device like that described above may be configured such that each excitation light source can be attached to and detached from the laser device in a state where the laser device is installed in a laser system. In such a configuration, in a case where each excitation light source is replaced, it is necessary to severely adjust a position and an orientation of each excitation light source with respect to a laser medium such that an excitation distribution in the laser medium is in a desired state. On the other hand, a laser device like that described above may be configured such that the entire light device can be attached to and detached from the laser system. In such a configuration, in a case where each excitation light source is replaced, it is necessary to severely adjust a position and an orientation of the laser device in the laser system such that an optical axis of a laser medium is aligned with an optical axis of the laser system.

An object of the present disclosure is to provide a laser device capable of facilitating attachment and detachment of a plurality of excitation light sources and facilitating positioning of the plurality of excitation light sources and a method of manufacturing such a laser device.

Solution to Problem

According to an aspect of the present disclosure, there is provided a laser device including: a rod-shaped laser medium extending in a first direction; a first light source unit including a first base and a plurality of excitation light sources attached to the first base; a second light source unit arranged side by side with the first light source unit in a second direction intersecting with the first direction, the second light source unit including a second base and a plurality of excitation light sources attached to the second base; and a holder supporting the laser medium, the first light source unit, and the second light source unit, wherein at least one of the first base and the holder includes a first regulating part configured to regulate a position of the first base with respect to the holder, and wherein at least one of the second base and the holder includes a second regulating part configured to regulate a position of the second base with respect to the holder.

In this laser device, the first base and the plurality of excitation light sources are unitized as the first light source unit, and the second base and the plurality of excitation light sources are unitized as the second light source unit. The first light source unit and the second light source unit are supported by the holder in a state where they are arranged side by side in the second direction. As a result, the plurality of excitation light sources can be easily attached to and detached from the holder by simply attaching and detaching each of the first base and the second base to and from the holder. Furthermore, when each of the first base and the second base is attached to the holder supporting the laser medium, the position of the first base with respect to the holder is regulated by the first regulating part, and the position of the second base with respect to the holder is regulated by the second regulating part. As a result, the plurality of excitation light sources can be easily positioned with respect to the laser medium by simply attaching each of the first base and the second base to the holder supporting the laser medium. As described above, according to this laser device, it is possible to facilitate the attachment and detachment of the plurality of excitation light sources and to facilitate the positioning of the plurality of excitation light sources.

In the laser device according to the aspect of the present disclosure, the holder may include a first holding member and a second holding member arranged side by side in the first direction and a connecting member connecting the first holding member and the second holding member to each other, and the first light source unit and the second light source unit may be disposed between the first holding member and the second holding member. According to this configuration, the size of the laser device can be reduced and the structure can be simplified.

In the laser device according to the aspect of the present disclosure, the connecting member may have a support surface supporting the first base and the second base slidably in the second direction. According to this configuration, the plurality of excitation light sources can be easily attached to and detached from the holder by sliding each of the first base and the second base on the support surface of the connecting member.

In the laser device according to the aspect of the present disclosure, the connecting member may include a first stopper configured to restrict movement of the first base in the second direction as the first regulating part and may include a second stopper configured to restrict movement of the second base in the second direction as the second regulating part. According to this configuration, the plurality of excitation light sources can be easily and reliably positioned with respect to the laser medium by bringing the first base and the second base into contact with the first stopper and the second stopper of the connecting member, respectively.

In the laser device according to the aspect of the present disclosure, the first base may include a first flow path through which a coolant flows, the second base may include a second flow path through which a coolant flows, and the holder may include a third flow path through which a coolant flows. According to this configuration, the laser medium and the plurality of excitation light sources can be cooled.

In the laser device according to the aspect of the present disclosure, the first flow path, the second flow path, and the third flow path may communicate with each other. According to this configuration, the laser medium and the plurality of excitation light sources can be efficiently cooled.

In the laser device according to the aspect of the present disclosure, the holder may include a tubular body in which the laser medium is disposed, the tubular body may have light transmittance, the third flow path may include a main flow path including a flow path between the laser medium and the tubular body, a first branch flow path and a second branch flow path branching from the main flow path, and a third branch flow path and a fourth branch flow path joining the main flow path, a downstream end of the first branch flow path may be connected to an upstream end of the first flow path, a downstream end of the second branch flow path may be connected to an upstream end of the second flow path, an upstream end of the third branch flow path may be connected to the downstream end of the first flow path, and an upstream end of the fourth branch flow path may be connected to the downstream end of the second flow path. According to this configuration, the laser medium and the plurality of excitation light sources can be efficiently cooled with a simple flow path configuration.

In the laser device according to the aspect of the present disclosure, the plurality of excitation light sources may be disposed along a circumference centered on a center line of the laser medium when viewed in the first direction. According to this configuration, an excitation distribution in the laser medium can be made uniform.

In the laser device according to the aspect of the present disclosure, each of the plurality of excitation light sources may include a semiconductor laser element. According to this configuration, the lifetime of each of the excitation light sources can be extended. In addition, since the plurality of excitation light sources are unitized as the first light source unit or the second light source unit, delicacy required for handling an individual item of the semiconductor laser element is not necessary.

In the laser device according to the aspect of the present disclosure, the semiconductor laser element may include a plurality of stacked semiconductor laser bars. According to this configuration, the laser medium can be efficiently and sufficiently excited.

According to another aspect of the present disclosure, there is provided a laser device including: a rod-shaped laser medium extending in a first direction; a first light source unit including a first base and a plurality of excitation light sources attached to the first base; a second light source unit arranged side by side with the first light source unit in a second direction intersecting with the first direction, the second light source unit including a second base and a plurality of excitation light sources attached to the second base; and a holder supporting the laser medium, the first light source unit, and the second light source unit, wherein at least one of the first base and the holder includes a first regulating part configured to regulate a position of the first base with respect to the holder, and wherein at least one of the first base and the second base includes a second regulating part configured to regulate a position of the second base with respect to the first base.

In this laser device, the first base and the plurality of excitation light sources are unitized as the first light source unit, and the second base and the plurality of excitation light sources are unitized as the second light source unit. The first light source unit and the second light source unit are supported by the holder in a state where they are arranged side by side in the second direction. As a result, the plurality of excitation light sources can be easily attached to and detached from the holder by simply attaching and detaching each of the first base and the second base to and from the holder. Furthermore, when each of the first base and the second base is attached to the holder supporting the laser medium, the position of the first base with respect to the holder is regulated by the first regulating part, and the position of the second base with respect to the first base is regulated by the second regulating part. As a result, the plurality of excitation light sources can be easily positioned with respect to the laser medium by simply attaching each of the first base and the second base to the holder supporting the laser medium. As described above, according to this laser device, it is possible to facilitate the attachment and detachment of the plurality of excitation light sources and to facilitate the positioning of the plurality of excitation light sources.

According to still another aspect of the present disclosure, there is provided a method for manufacturing a laser device, including: a step of preparing a first light source unit including a first base and a plurality of excitation light sources attached to the first base and a second light source unit including a second base and a plurality of excitation light sources attached to the second base; and a step of disposing the first base on a holder supporting a rod-shaped laser medium extending in a first direction from one side in a second direction intersecting with the first direction and disposing the second base on the holder from the other side in the second direction to arrange the first light source unit and the second light source unit side by side in the second direction.

In this method for manufacturing the laser device, the plurality of excitation light sources can be easily positioned with respect to the laser medium by simply disposing the first base on the holder from one side in the second direction intersecting with the first direction in which the rod-shaped laser medium extends and disposing the second base on the holder from the other side in the second direction. Therefore, according to this method for manufacturing the laser device, the laser device in which the plurality of excitation light sources are positioned with respect to the laser medium can be easily obtained.

Advantageous Effects of Invention

According to the present disclosure, it is possible to provide a laser device capable of facilitating attachment and detachment of a plurality of excitation light sources and facilitating positioning of the plurality of excitation light sources and a method of manufacturing such a laser device.

DESCRIPTION OF EMBODIMENTS

Figure 1:
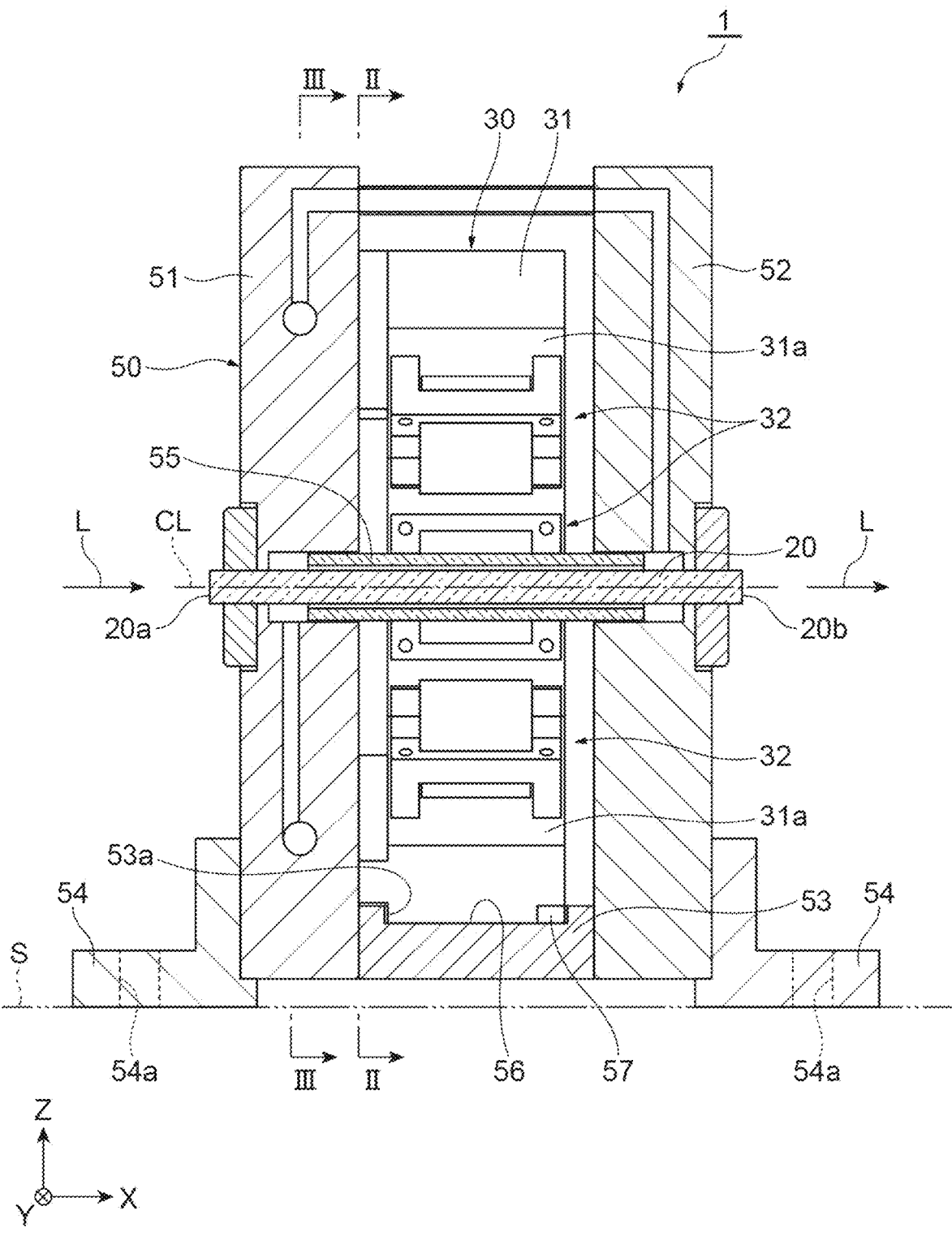
FIG. 1 is a cross-sectional view of a laser device according to an embodiment.

Hereinafter, an embodiment of the present disclosure will be described in detail with reference to the drawings. The same or corresponding parts in the drawings are denoted with the same reference signs, and repetitive description will be omitted.

Figure 2:
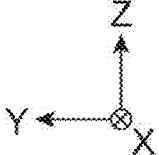
FIG. 2 is a cross-sectional view of the laser device along line II-II shown in FIG. 1.

As shown in FIGS. 1 and 2, the laser device 1 includes a laser medium 20, a first light source unit 30, a second light source unit 40, and a holder 50. The laser medium 20, the first light source unit 30, and the second light source unit 40 are supported by the holder 50. As an example, the laser device 1 is used as a laser amplifier that amplifies laser light L in a laser system. Hereinafter, a direction in which the laser light L is incident on the laser device 1 is referred to as an X direction, a direction perpendicular to the X direction is referred to as a Y direction, and a direction perpendicular to both the X direction and the Y direction is referred to as a Z direction.

The laser medium 20 is a rod-shaped solid-state laser medium extending in the X direction (a first direction). The laser medium 20 has a center line CL parallel to the X direction. A shape of the laser medium 20 is, for example, a circular column shape having a diameter of approximately 10 mm and a length of approximately 200 mm. A material of the laser medium 20 is Nd:YAG, for example.

The first light source unit 30 and the second light source unit 40 are arranged side by side in the Y direction (a second direction intersecting with the first direction). The first light source unit 30 is disposed on one side in the Y direction with respect to the center line CL. The second light source unit 40 is disposed on the other side in the Y direction with respect to the center line CL. The first light source unit 30 includes a first base 31 and a plurality of excitation light sources 32. The plurality of excitation light sources 32 are attached to the first base 31. The second light source unit 40 includes a second base 41 and a plurality of excitation light sources 42. The plurality of excitation light sources 42 are attached to the second base 41.

Each of the first base 31 and the second base 41 is a plate-shaped member whose thickness direction is the X direction. A set of the first base 31 and the second base 41 defines an opening having a plurality of inner surfaces facing the laser medium 20. Each excitation light source 32 is disposed on each of a plurality of placement surfaces 31$a$ of the first base 31 among the plurality of inner surfaces. Each excitation light source 42 is disposed on each of a plurality of placement surfaces 41$a$ of the second base 41 among the plurality of inner surfaces. A shape of the set of the first base 31 and the second base 41 is, for example, a rectangular plate shape. A material of each of the first base 31 and the second base 41 is, for example, aluminum. A thickness of each of the first base 31 and the second base 41 is larger than a thickness of each of a first holding member

51 and a second holding member 52 which will be described later. As a result, the plurality of excitation light sources 32 and 42 can be reliably held.

Each of the plurality of excitation light sources 32 and 42 emits excitation light EL for exciting the laser medium 20. The plurality of excitation light sources 32 and 42 are disposed along a circumference centered on the center line CL of the laser medium 20 when viewed in the X direction. In the present embodiment, the set of the first base 31 and the second base 41 defines a regular hexagonal opening having six placement surfaces 31$a$ and 41$a$ as the plurality of inner surfaces, and six excitation light sources 32 and 42 are disposed at a pitch of 60° along the circumference centered on the center line CL. In this way, since the plurality of excitation light sources 32 and 42 are disposed inside the first base 31 and the second base 41 (on a side of the laser medium 20), even if an external impact is applied to the laser device 1, the plurality of excitation light sources 32 and 42 can be reliably protected.

Each excitation light source 32 includes a semiconductor laser element 33 and a lens 34. The semiconductor laser element 33 emits excitation light EL toward the laser medium 20. The lens 34 is disposed on a side of the laser medium 20 with respect to the semiconductor laser element 33. The lens 34 causes the excitation light EL emitted from the semiconductor laser element 33 to converge onto the laser medium 20. The semiconductor laser element 33 includes a plurality of semiconductor laser bars 33$a$ and a heat sink 33$b$. The plurality of semiconductor laser bars 33$a$ are stacked such that emission end surfaces of the semiconductor laser bars 33$a$ are arranged two-dimensionally in a plane perpendicular to a direction in which the semiconductor laser element 33 and the laser medium 20 face each other. The heat sink 33$b$ is disposed on the placement surface 31$a$ in a state where it supports the plurality of semiconductor laser bars 33$a$. The heat sink 33$b$ absorbs heat generated by the plurality of semiconductor laser bars 33$a$ and releases the heat to a side of the first base 31. Each excitation light source 32 may not include the lens 34.

Each excitation light source 42 includes a semiconductor laser element 43 and a lens 44. The semiconductor laser element 43 emits excitation light EL toward the laser medium 20. The lens 44 is disposed on a side of the laser medium 20 with respect to the semiconductor laser element 43. The lens 44 causes the excitation light EL emitted from the semiconductor laser element 43 to converge onto the laser medium 20. The semiconductor laser element 43 includes a plurality of semiconductor laser bars 43$a$ and a heat sink 43$b$. The plurality of semiconductor laser bars 43$a$ are stacked such that emission end surfaces of the semiconductor laser bars 43$a$ are arranged two-dimensionally in a plane perpendicular to a direction in which the semiconductor laser element 43 and the laser medium 20 face each other. The heat sink 43$b$ is disposed on the placement surface 41$a$ in a state where it supports the plurality of semiconductor laser bars 43$a$. The heat sink 43$b$ absorbs heat generated by the plurality of semiconductor laser bars 43$a$ and releases the heat to a side of the second base 41. Each excitation light source 42 may not include the lens 44.

The holder 50 includes a first holding member 51, a second holding member 52, a connecting member 53, a pair of leg members 54, and a tubular body 55. As an example, the holder 50 is attached to an installation section S of the laser system.

Each of the first holding member 51 and the second holding member 52 is a plate-shaped member whose thickness direction is the X direction. The first holding member 51 and the second holding member 52 are arranged side by side in the X direction at a predetermined interval. The first holding member 51 holds one end portion of the laser medium 20 in the X direction in a state where one end surface 20a of the laser medium 20 in the X direction is exposed. The second holding member 52 holds the other end portion of the laser medium 20 in the X direction in a state where the other end surface 20a of the laser medium 20 in the X direction is exposed. The first light source unit 30 and the second light source unit 40 are disposed between the first holding member 51 and the second holding member 52. A shape of each of the first holding member 51 and the second holding member 52 is, for example, a rectangular plate shape. A material of each of the first holding member 51 and the second holding member 52 is, for example, aluminum. The first light source unit 30 and the second light source unit 40 are positioned inside outer edges of the first holding member 51 and the second holding member 52 (that is, do not protrude outward from the outer edges) when viewed in the X direction. As a result, even if an impact is applied to the laser device 1 in the X direction, the first light source unit 30 and the second light source unit 40 can be reliably protected.

The connecting member 53 is a plate-shaped member whose thickness direction is the Z direction. The connecting member 53 connects the first holding member 51 and the second holding member 52 to each other. In the present embodiment, the connecting member 53 spans between an end portion of the first holding member 51 on a side of the installation section S and an end portion of the second holding member 52 on a side of the installation portion S. A shape of the connecting member 53 is, for example, a rectangular plate shape. A material of the connecting member 53 is, for example, aluminum.

The pair of leg members 54 are attached to the end portion of the first holding member 51 on a side of the installation section S and the end portion of the second holding member 52 on a side of the installation section S. Each leg member 54 has a plurality of elongated holes 54a whose longitudinal direction is the Y direction. As an example, the holder 50 is fixed to the installation section S by a plurality of bolts (not shown) being fastened to the installation section S through the plurality of elongated holes 54a.

The tubular body 55 is a tube-shaped member extending in the X direction. The tubular body 55 spans between the first holding member 51 and the second holding member 52 in a state where the laser medium 20 is disposed inside the tubular body 55. The tubular body 55 has optical transmittance (transmittance with respect to the excitation light EL emitted from each of the excitation light sources 32 and 42). A shape of the tubular body 55 is, for example, a cylindrical shape. A material of the tubular body 55 is, for example, synthetic quartz.

The connecting member 53 has a groove 53a extending in the Y direction. Both ends of the groove 53a in the Y direction are open on one side and the other side in the Y direction. A bottom surface of the groove 53a is a support surface 56 supporting the first base 31 and the second base 41 slidably in the Y direction. The connecting member 53 includes a first stopper (first regulating part) 57 and a second stopper (second regulating part) 58. The first stopper 57 restricts movement of the first base 31 in the Y direction. More specifically, the first stopper 57 restricts the movement of the first base 31 toward the laser medium 20 in the Y direction. The second stopper 58 restricts movement of the second base 41 in the Y direction. More specifically, the second stopper 58 restricts the movement of the second base 41 toward the laser medium 20 in the Y direction.

A position of the first base 31 in the X direction and the Z direction with respect to the holder 50 (furthermore, with respect to the laser medium 20) is regulated by fitting the first base 31 into the groove 53a of the connecting member 53. A position of the first base 31 in the Y direction with respect to the holder 50 (furthermore, with respect to the laser medium 20) is regulated by bringing the first base 31 into contact with the first stopper 57. In this state, the first base 31 is fixed to each of the first holding member 51 and the second holding member 52 with bolts (not shown) or the like.

A position of the second base 41 in the X direction and the Z direction with respect to the holder 50 (furthermore, with respect to the laser medium 20) is regulated by fitting the second base 41 into the groove 53a of the connecting member 53. A position of the second base 41 in the Y direction with respect to the holder 50 (furthermore, with respect to the laser medium 20) is regulated by bringing the second base 41 into contact with the second stopper 58. In this state, the second base 41 is fixed to each of the first holding member 51 and the second holding member 52 with bolts (not shown) or the like.

Figure 3:
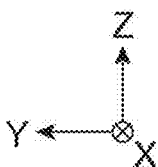
FIG. 3 is a cross-sectional view of the laser device along line III-III shown in FIG. 1.
Figure 4:
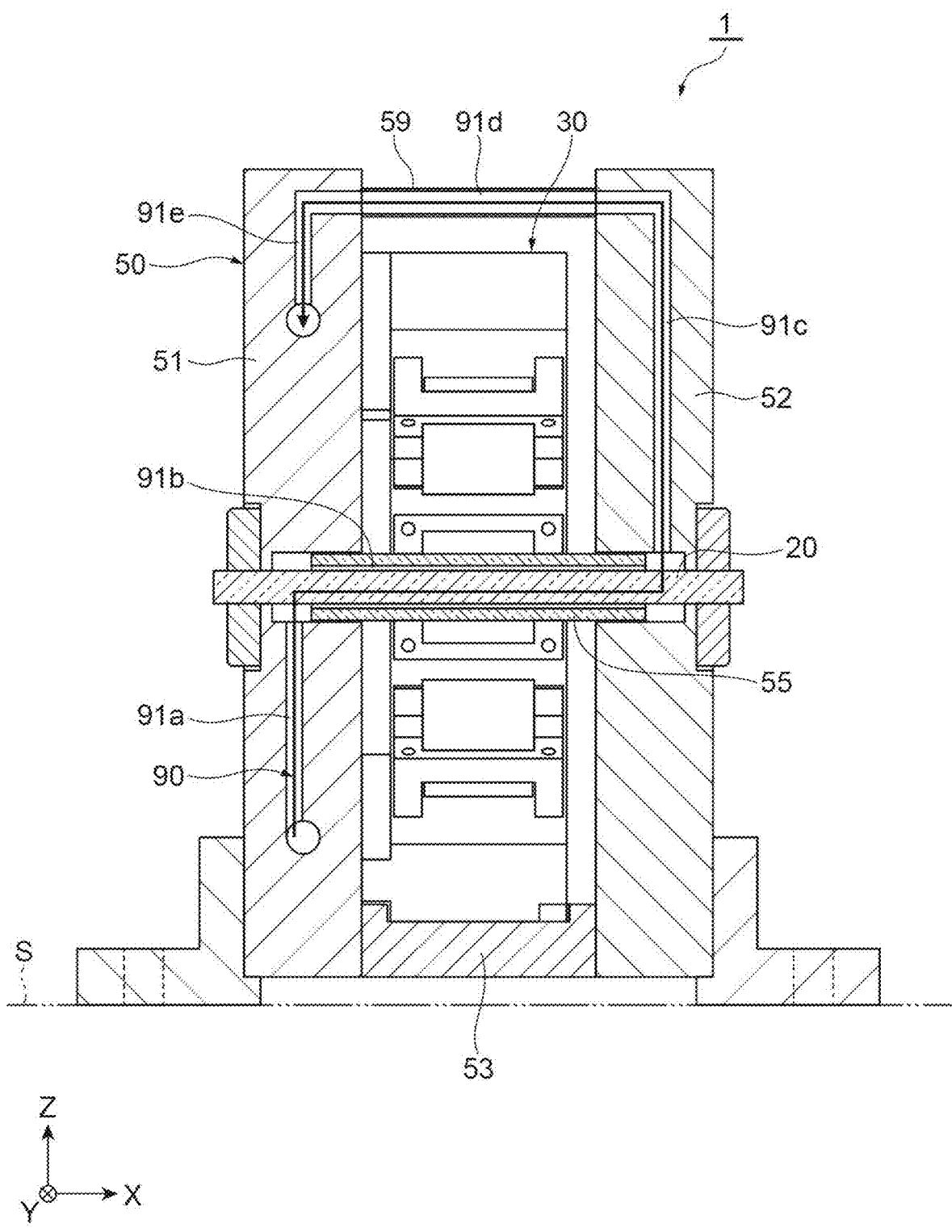
FIG. 4 is a cross-sectional view of the laser device along line IV-IV shown in FIG. 3.
Figure 5:
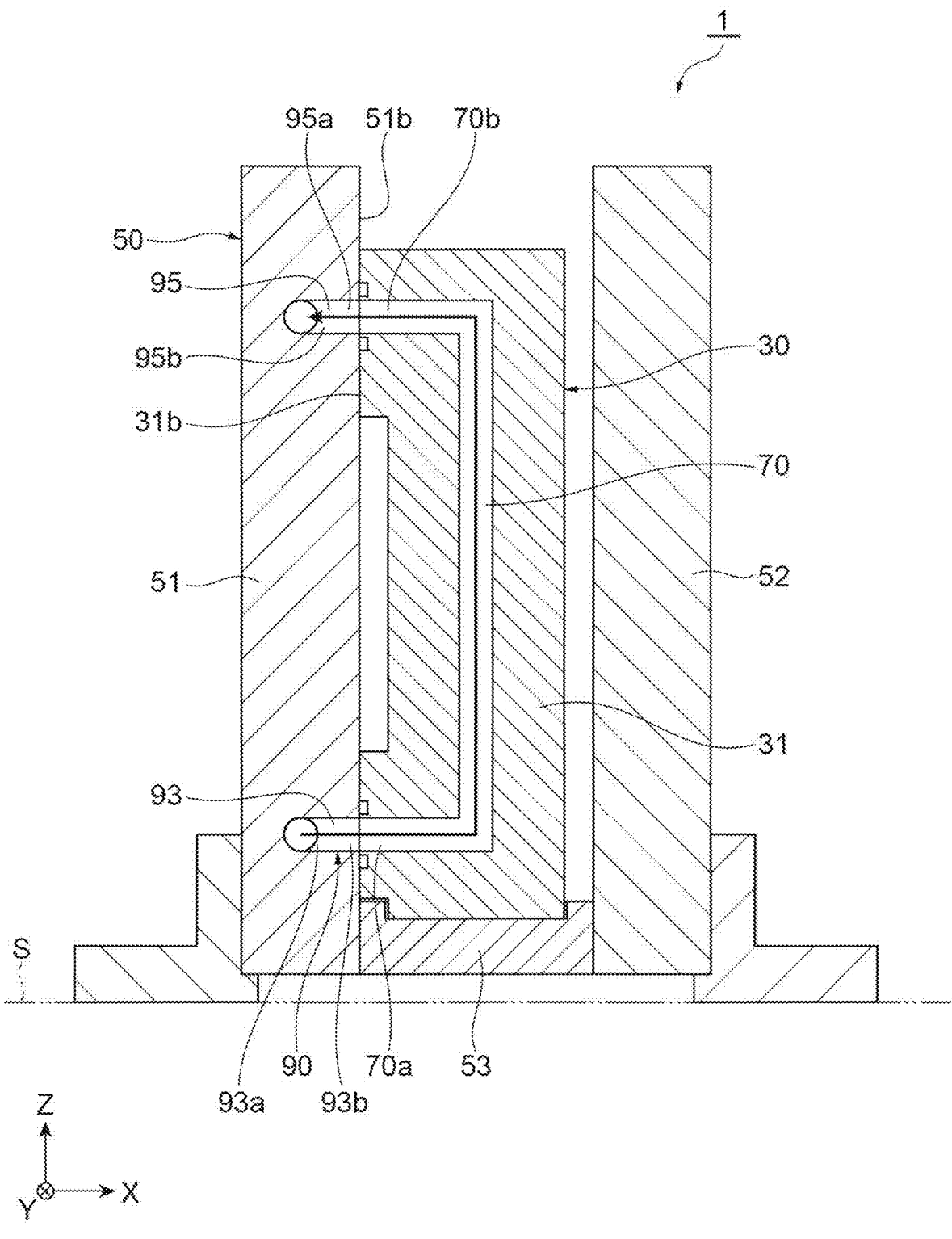
FIG. 5 is a cross-sectional view of the laser device along line V-V shown in FIG. 3.
Figure 6:
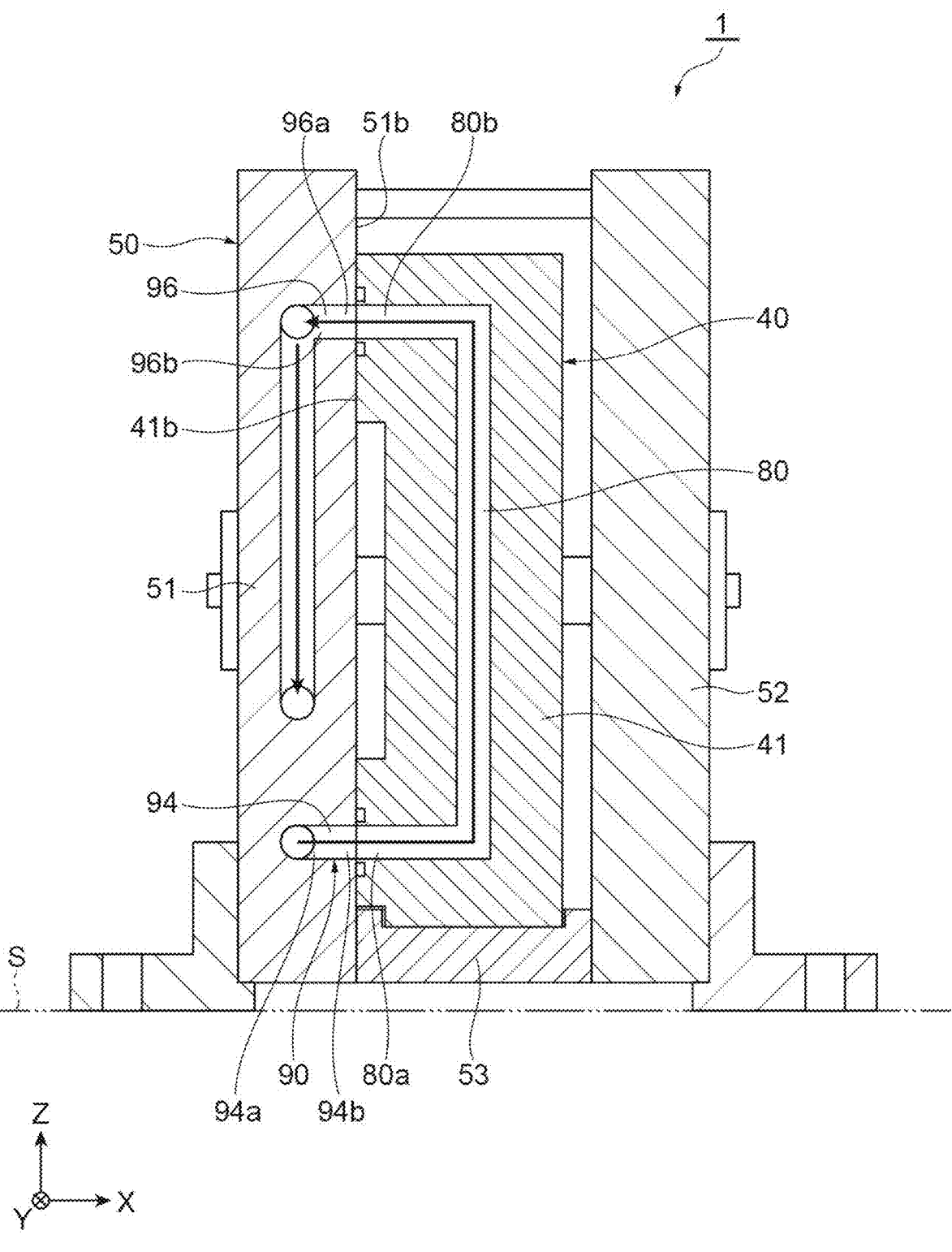
FIG. 6 is a cross-sectional view of the laser device along line VI-VI shown in FIG. 3.

As shown in FIGS. 3 and 4, the holder 50 includes a third flow path 90. As shown in FIG. 5, the first base 31 includes a first flow path 70. As shown in FIG. 6, the second base 41 includes a second flow path 80. A coolant flows through the first flow path 70, the second flow path 80, and the third flow path 90. The coolant is, for example, water. The first flow path 70, the second flow path 80, and the third flow path 90 communicate with each other. That is, the first flow path 70, the second flow path 80, and the third flow path 90 are connected to each other such that the coolant supplied from a common supply source (not shown) flows therethrough.

As shown in FIGS. 3 and 4, the third flow path 90 includes a main flow path 91. The main flow path 91 includes a plurality of flow path portions 91a, 91b, 91c, 91d, and 91e. The flow path portion 91b is a flow path between the laser medium 20 and the tubular body 55. The flow path portion 91d is a flow path in a pipe 59 that spans between the first holding member 51 and the second holding member 52.

The flow path portion 91a is formed in the first holding member 51. An upstream end of the flow path portion 91a is positioned on a side surface 51a of the first holding member 51. The upstream end of the flow path portion 91a is a coolant supply port. A downstream end of the flow path portion 91a is connected to an upstream end of the flow path portion 91b. The flow path portion 91c is formed in the second holding member 52. An upstream end of the flow path portion 91c is connected to a downstream end of the flow path portion 91b. A downstream end of the flow path portion 91c is connected to an upstream end of the flow path portion 91d. The flow path portion 91e is formed in the first holding member 51. An upstream end of the flow path portion 91e is connected to a downstream end of the flow path portion 91d. A downstream end of the flow path portion 91e is positioned on the side surface 51a of the first holding member 51. The downstream end of the flow path portion 91e is a coolant discharge port. Since the upstream end of the flow path portion 91a, which is the coolant supply port, and the downstream end of the flow path portion 91e, which is the coolant discharge port, are positioned on the side surface 51a of the first holding member 51, it is easy to handle an external pipe.

In the main flow path 91 configured as described above, the coolant is supplied from the upstream end of the flow path portion 91a, the coolant flows through the flow path portions 91a, 91b, 91c, 91d, and 91e in order, and the coolant is discharged from the downstream end of the flow path portion 91e. As a result, the laser medium 20 is cooled.

As shown in FIGS. 3, 5 and 6, the third flow path 90 further includes a first branch flow path 93 and a second branch flow path 94. The first branch flow path 93 and the second branch flow path 94 are formed in the first holding member 51. The first branch flow path 93 branches off from the main flow path 91. An upstream end 93a of the first branch flow path 93 is connected to the middle of the flow path portion 91a of the main flow path 91 (a portion of the main flow path 91 on an upstream side of the flow path portion 91b). A downstream end 93b of the first branch flow path 93 is positioned on a surface 51b of the first holding member 51 on a side of the second holding member 52. The second branch flow path 94 branches off from the main flow path 91. An upstream end 94a of the second branch flow path 94 is connected to the middle of the flow path portion 91a of the main flow path 91. A downstream end 94b of the second branch flow path 94 is positioned on the surface 51b of the first holding member 51.

The third flow path 90 further includes a third branch flow path 95 and a fourth branch flow path 96. The third branch flow path 95 and the fourth branch flow path 96 are formed in the first holding member 51. The third branch flow path 95 joins the main flow path 91. An upstream end 95a of the third branch flow path 95 is positioned on the surface 51b of the first holding member 51. A downstream end 95b of the third branch flow path 95 is connected to the middle of the flow path portion 91e of the main flow path 91 (a portion of the main flow path 91 on a downstream side of the flow path portion 91b). The fourth branch flow path 96 joins the main flow path 91. An upstream end 96a of the fourth branch flow path 96 is positioned on the surface 51b of the first holding member 51. A downstream end 96b of the fourth branch flow path 96 is connected to the middle of the flow path portion 91e of the main flow path 91.

As shown in FIG. 5, the first flow path 70 is formed in the first base 31 to extend in a straight linear shape in the Z direction when viewed in the X direction. An upstream end 70a and a downstream end 70b of the first flow path 70 are positioned on a surface 31b of the first base 31 on a side of the first holding member 51. The surface 31b of the first base 31 is in contact with the surface 51b of the first holding member 51. In this state, the downstream end 93b of the first branch flow path 93 is connected to the upstream end 70a of the first flow path 70, and the upstream end 95a of the third branch flow path 95 is connected to the downstream end 70b of the first flow path 70. For example, an O-ring is used for the connection between the downstream end 93b and the upstream end 70a and the connection between the upstream end 95a and the downstream end 70b, and thus leakage of the coolant is prevented.

In the first branch flow path 93, the first flow path 70, and the third branch flow path 95 configured as described above, the coolant is supplied from the main flow path 91 at the upstream end 93a of the first branch flow path 93, the coolant flows through the first branched flow path 93, the first flow path 70, and the third branched flow path 95 in that order, and the coolant at the downstream end 95b of the third branched flow path 95 joins that of the main flow path 91. As a result, the first base 31 is cooled. In the semiconductor laser element 33 of each excitation light source 32, the plurality of semiconductor laser bars 33a are cooled via the heat sink 33b by the first base 31 being cooled.

As shown in FIG. 6, the second flow path 80 is formed in the second base 41 to extend in a straight linear shape in the Z direction when viewed in the X direction. An upstream end 80a and a downstream end 80b of the second flow path 80 are positioned on a surface 41b of the second base 41 on a side of the first holding member 51. The surface 41b of the second base 41 is in contact with the surface 51b of the first holding member 51. In this state, the downstream end 94b of the second branch flow path 94 is connected to the upstream end 80a of the second flow path 80, and the upstream end 96a of the fourth branch flow path 96 is connected to the downstream end 80b of the second flow path 80. For example, an O-ring is used for the connection between the downstream end 94b and the upstream end 80a and the connection between the upstream end 96a and the downstream end 80b, and thus leakage of the coolant is prevented.

In the second branch flow path 94, the second flow path 80, and the fourth branch flow path 96 configured as described above, the coolant is supplied from the main flow path 91 at the upstream end 94a of the second branch flow path 94, the coolant flows through the second branched flow path 94, the second flow path 80, and the fourth branched flow path 96 in that order, and the coolant at the downstream end 96b of the fourth branched flow path 96 joins that of the main flow path 91. As a result, the second base 41 is cooled. In the semiconductor laser element 43 of each excitation light source 42, the plurality of semiconductor laser bars 43a are cooled via the heat sink 43b by the second base 41 being cooled.

Figure 7:
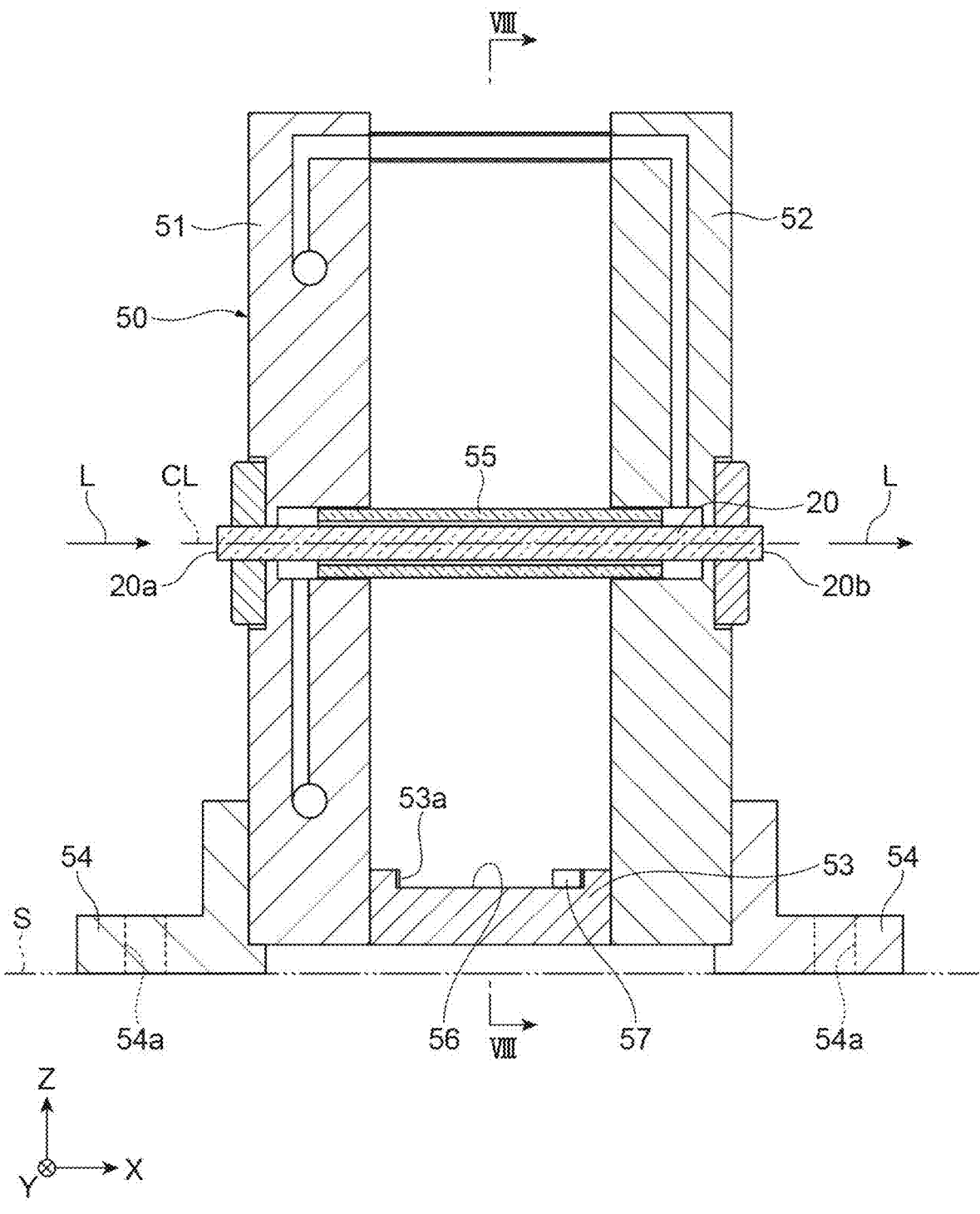
FIG. 7 is a cross-sectional view of a laser device for explaining a method for manufacturing a laser device according to an embodiment.
Figure 8:
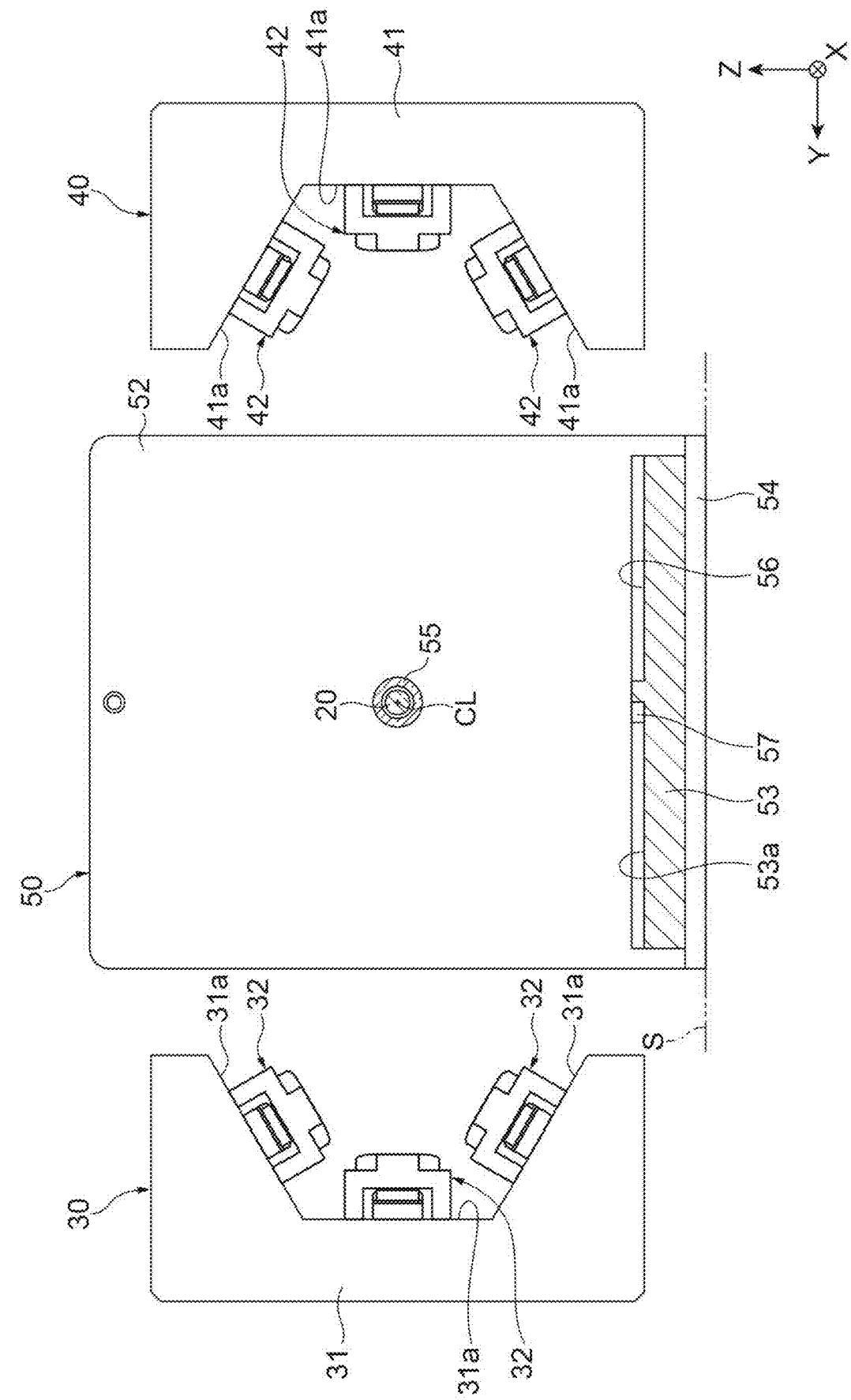
FIG. 8 is a cross-sectional view of the laser device along line VI-VI shown in FIG. 7.

A method for manufacturing the laser device 1 will be described. In the present embodiment, as shown in FIG. 7, the holder 50 supporting the laser medium 20 is attached to the installation section S of the laser system. First, as shown in FIG. 8, the first light source unit 30 and the second light source unit 40 are prepared (a preparing step). Subsequently, the first base 31 is disposed on the holder 50, which supports the laser medium 20, from one side in the Y direction, and the second base 41 is disposed on the holder 50 from the other side in the Y direction to arrange the first light source unit 30 and the second light source unit 40 side by side in the Y direction (an arranging step). In this state, the first base 31 is fixed to each of the first holding member 51 and the second holding member 52 with bolts (not shown) or the like, and the second base 41 is fixed to each of the first holding member 51 and the second holding member 52 with bolts (not shown) or the like.

When the first base 31 is attached to the holder 50, the position of the first base 31 in the X direction and the Z direction with respect to the holder 50 (furthermore, with respect to the laser medium 20) is regulated by fitting the first base 31 into the groove 53a of the connecting member 53. In addition, the position of the first base 31 in the Y direction with respect to the holder 50 (furthermore, with respect to the laser medium 20) is regulated by sliding the first base 31 on the support surface 56 of the connecting member 53 and bringing the first base 31 into contact with the first stopper 57. At this time, the first base 31 is prevented from coining into contact with the tubular body 55 and damaging the tubular body 55.

When the second base 41 is attached to the holder 50, the position of the second base 41 in the X direction and the Z direction with respect to the holder 50 (furthermore, with respect to the laser medium 20) is regulated by fitting the second base 41 into the groove 53a of the connecting member 53. In addition, the position of the second base 41 in the Y direction with respect to the holder 50 (furthermore, with respect to the laser medium 20) is regulated by sliding the second base 41 on the support surface 56 of the connecting member 53 and bringing the second base 41 into contact with the second stopper 58. At this time, the second base 41 is prevented from coining into contact with the tubular body 55 and damaging the tubular body 55.

As described above, in the laser device 1, the first base 31 and the plurality of excitation light sources 32 are unitized as the first light source unit 30, and the second base 41 and the plurality of excitation light sources 42 are unitized as the second light source unit 40. The first light source unit 30 and the second light source unit 40 are supported by the holder 50 in a state where they are arranged side by side in the Y direction. As a result, the plurality of excitation light sources 32 and 42 can be easily attached to and detached from the holder 50 by simply attaching and detaching each of the first base 31 and the second base 41 to and from the holder 50. Furthermore, when each of the first base 31 and the second base 41 is attached to the holder 50 supporting the laser medium 20, the position of the first base 31 with respect to the holder 50 is regulated by the first stopper 57, and the position of the second base 41 with respect to the holder 50 is regulated by the second stopper 58. As a result, the plurality of excitation light sources 32 and 42 can be easily positioned with respect to the laser medium 20 by simply attaching each of the first base 31 and the second base 41 to the holder 50 supporting the laser medium 20. As described above, according to the laser device 1, it is possible to facilitate the attachment and detachment of the plurality of excitation light sources 32 and 42 and to facilitate the positioning of the plurality of excitation light sources 32 and 42.

In the laser device 1, the holder 50 includes the first holding member 51 and the second holding member 52 arranged side by side in the X direction and the connecting member 53 connecting the first holding member 51 and the second holding member 52 to each other, and the first light source unit 30 and the second light source unit 40 are disposed between the first holding member 51 and the second holding member 52. As a result, the size of the laser device 1 can be reduced and the structure can be simplified.

In the laser device 1, the connecting member 53 has the support surface 56 supporting the first base 31 and the second base 41 slidably in the Y direction. As a result, the plurality of excitation light sources 32 and 42 can be easily attached to and detached from the holder 50 by sliding each of the first base 31 and the second base 41 on the support surface 56 of the connecting member 53.

In the laser device 1, the connecting member 53 includes the first stopper 57 configured to restrict movement of the first base 31 in the Y direction and the second stopper 58 configured to restrict movement of the second base 41 in the Y direction. As a result, the plurality of excitation light sources 32 and 42 can be easily and reliably positioned with respect to the laser medium 20 by bringing the first base 31 and the second base 41 into contact with the first stopper 57 and the second stopper 58 of the connecting member 53, respectively.

In the laser device 1, the first base 31 includes the first flow path 70 through which the coolant flows, the second base 41 includes the second flow path 80 through which the coolant flows, and the holder 50 includes the third flow path 90 through which the coolant flows. As a result, the laser medium 20 and the plurality of excitation light sources 32 and 42 can be cooled. In the laser device 1, the first flow path 70, the second flow path 80, and the third flow path 90 communicate with each other. As a result, the laser medium 20 and the plurality of excitation light sources 32 and 42 can be efficiently cooled.

In the laser device 1, the third flow path 90 includes the main flow path 91 including the flow path portion 91b between the laser medium 20 and the tubular body 55, the first branch flow path 93 and the second branch flow path 94 branching from the main flow path 91, and the third branch flow path 95 and the fourth branch flow path 96 joining the main flow path 91. In the laser device 1, the downstream end 93b of the first branch flow path 93 is connected to the upstream end 70a of the first flow path 70, the downstream end 94b of the second branch flow path 94 is connected to the upstream end 80a of the second flow path 80, the upstream end 95a of the third branch flow path 95 is connected to the downstream end 70b of the first flow path 70, and the upstream end 96a of the fourth branch flow path 96 is connected to the downstream end 80b of the second flow path 80. As a result, the laser medium 20 and the plurality of excitation light sources 32 and 42 can be efficiently cooled with a simple flow path configuration.

In the laser device 1, the plurality of excitation light sources 32 and 42 are disposed along a circumference centered on the center line CL of the laser medium 20 when viewed in the X direction. According to this configuration, an excitation distribution in the laser medium 20 can be made uniform.

In the laser device 1, each excitation light source 32 includes the semiconductor laser element 33, and each excitation light source 42 includes the semiconductor laser element 43. As a result, the lifetime of each of the excitation light sources 32 and 42 can be extended. In addition, since the plurality of excitation light sources 32 are unitized as the first light source unit 30, and the plurality of excitation light sources 42 are unitized as the second light source unit 40, delicacy required for handling an individual item of the semiconductor laser element is not necessary.

In the laser device 1, the semiconductor laser element 33 includes the plurality of stacked semiconductor laser bars 33a, and the semiconductor laser element 43 includes the plurality of stacked semiconductor laser bars 43a. As a result, the laser medium 20 can be efficiently and sufficiently excited.

In the method for manufacturing the laser device 1, the plurality of excitation light sources 32 and 42 can be easily positioned with respect to the laser medium 20 by simply disposing the first base 31 on the holder 50 from one side in the Y direction intersecting with the X direction in which the rod-shaped laser medium 20 extends and disposing the second base 41 on the holder 50 from the other side in the Y direction. Therefore, according to the method for manufacturing the laser device 1, the laser device 1 in which the plurality of excitation light sources 32 and 42 are positioned with respect to the laser medium 20 can be easily obtained.

Figure 9:
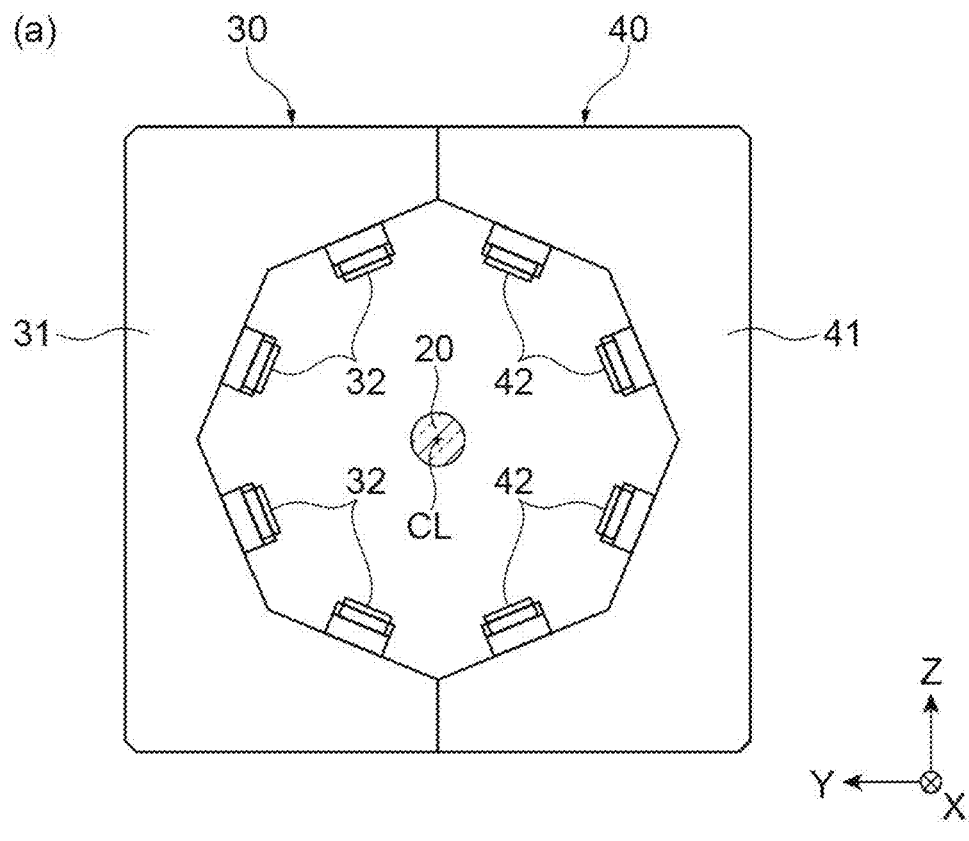
FIG. 9 shows front views of first light source units and second light source units according to modification examples.
Figure 9:
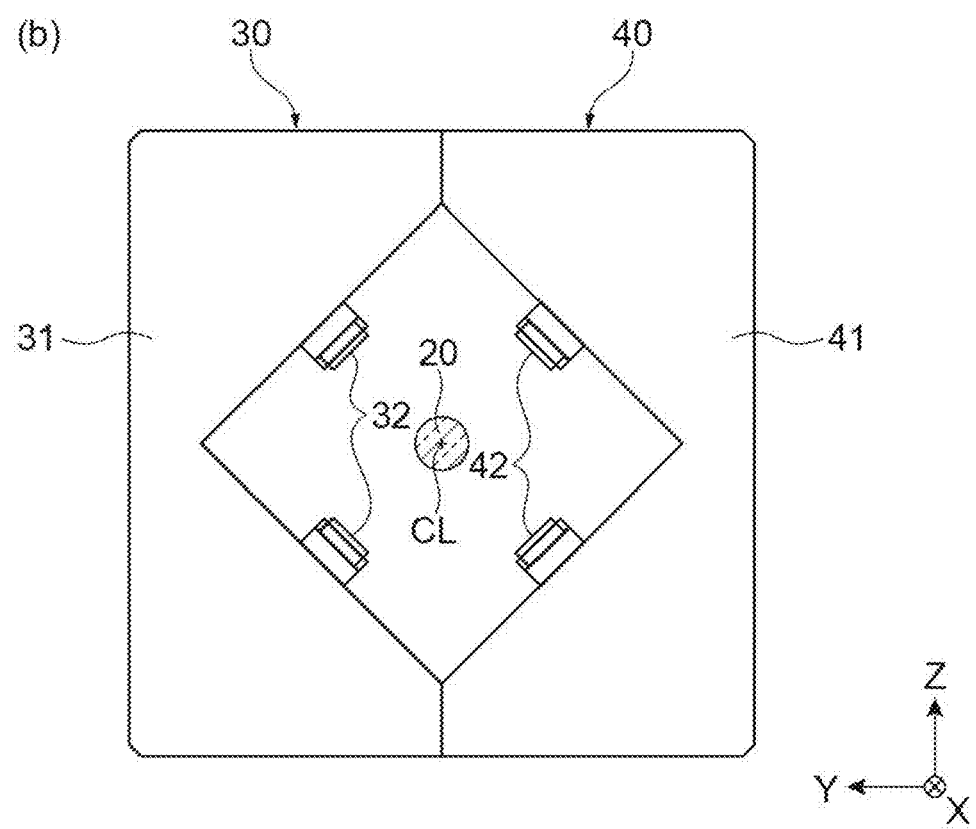

The present disclosure is not limited to the above embodiment. For example, the first light source unit 30 includes three excitation light sources 32 in the above embodiment, but the first light source unit 30 only has to include a plurality of excitation light sources 32. Similarly, the second light source unit 40 includes three excitation light sources 42 in the above embodiment, but the second light source unit 40 only has to include a plurality of excitation light sources 42. As an example, as shown in (a) of FIG. 9, the first light source unit 30 may include four excitation light sources 32, and the second light source unit 40 may include four excitation light sources 42. As shown in (b) of FIG. 9, the first light source unit 30 may include two excitation light sources 32, and the second light source unit 40 may include two excitation light sources 42. In either case, the plurality of excitation light sources 32 and 42 are disposed at equal angular pitches along the circumference centered on the center line CL.

Figure 10:
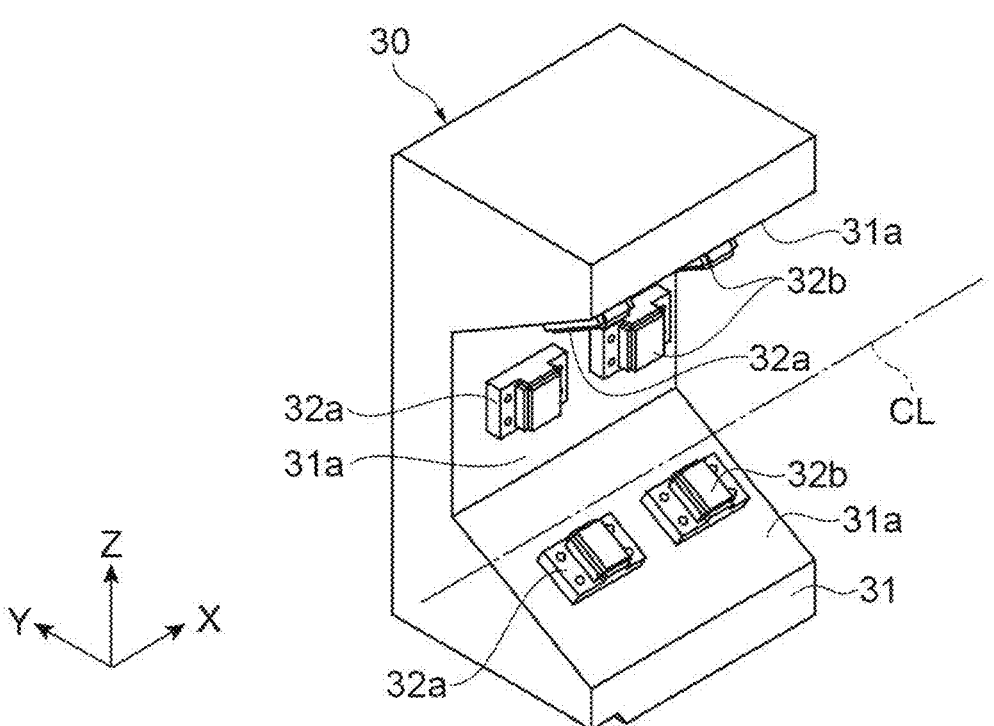
FIG. 10 shows perspective views of first light source units according to modification examples.
Figure 10:
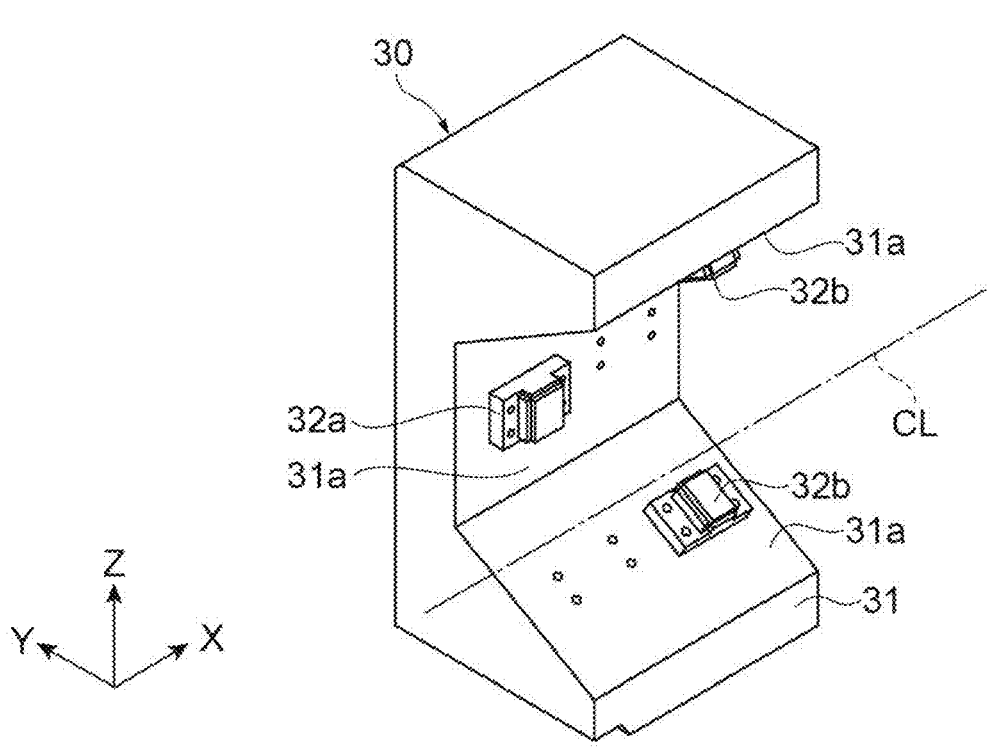

As shown in (a) of FIG. 10, the first light source unit 30 may include a plurality of excitation light sources 32*a* disposed in a row along a circumference centered on the center line CL and a plurality of excitation light sources 32*b* disposed in a row along a circumference shifted the above circumference in the X direction. In the first light source unit 30 shown in (a) of FIG. 10, one excitation light source 32*a* and one excitation light source 32*b* are arranged side by side in the X direction. The second light source unit 40 combined with the first light source unit 30 also has the same configuration as the first light source unit 30.

As shown in (b) of FIG. 10, the first light source unit 30 may include at least one excitation light source 32*a* disposed along a circumference centered on the center line CL and a plurality of excitation light sources 32*b* disposed in another row along a circumference shifted the above circumference in the X direction. In the first light source unit 30 shown in (b) of FIG. 10, three excitation light sources 32*a* and 32*b* are disposed at a pitch of 60° along the circumference centered on the center line CL such that one excitation light source 32*a* is positioned between two excitation light sources 32*b* when viewed in the X direction. The second light source unit 40 combined with the first light source unit 30 also has the same configuration as the first light source unit 30.

Figure 11:
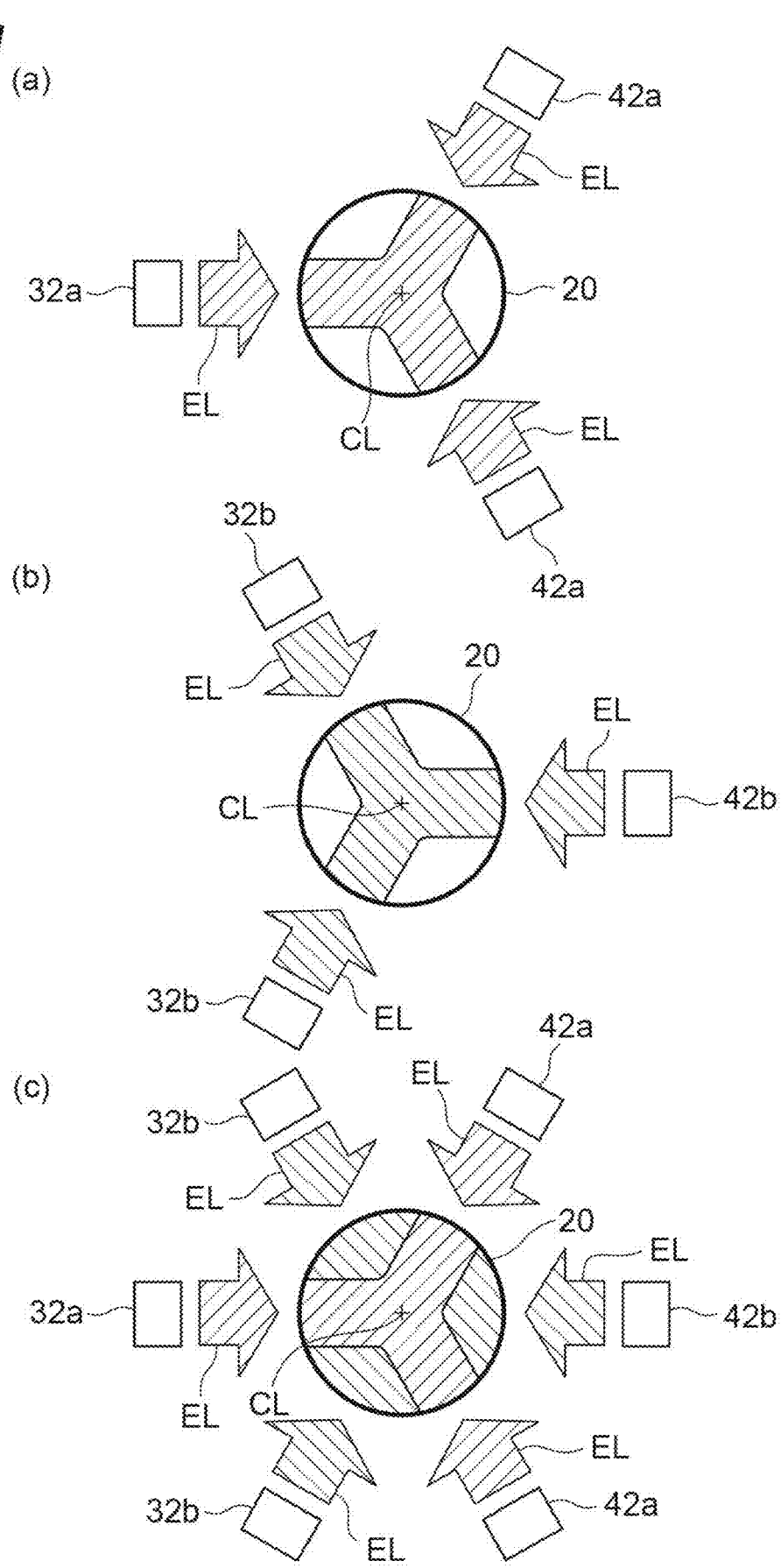
FIG. 11 shows schematic views showing excitation distributions of a laser medium caused by the first light source unit and the second light source unit according to the modification example.

In this case, one excitation light source 32*a* and two excitation light sources 42*a* are disposed at a pitch of 120° along the circumference centered on the center line CL, as shown in (a) of FIG. 11. Two excitation light source 32*b* and one excitation light sources 42*b* are disposed at a pitch of 120° along the circumference centered on the center line CL, as shown in (b) of FIG. 11. As a result, six excitation light sources 32*a*, 32*b*, 42*a*, and 42*b* are disposed at a pitch of 60° along the circumference centered on the center line CL when viewed in a direction parallel to the center line CL, as shown in (c) of FIG. 11. Accordingly, a uniform excitation distribution is given to the laser medium 20 by the excitation light EL emitted from each of the excitation light sources 32*a*, 32*b*, 42*a*, and 42*b*.

Figure 12:
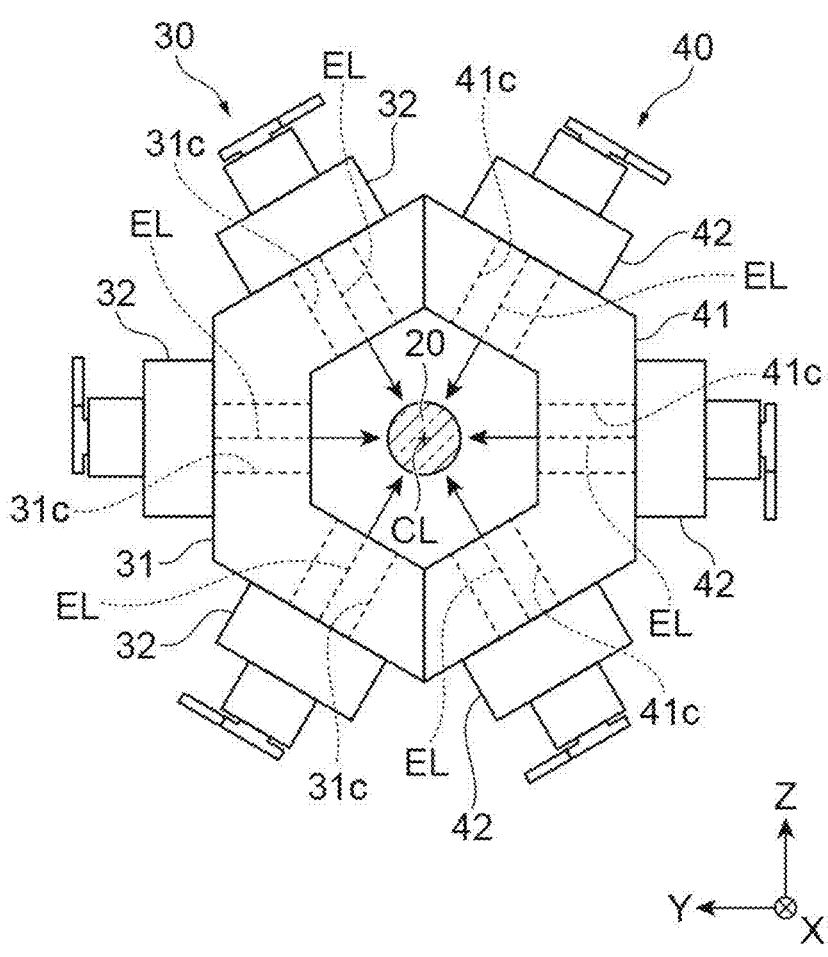
FIG. 12 is a front view of a first light source unit and a second light source unit according to a modification example.

As shown in FIG. 12, in the first light source unit 30, a plurality of excitation light sources 32 may be disposed on an outer surface of the first base 31, and a through hole 31*c* through which the excitation light EL emitted from each excitation light source 32 toward the laser medium 20 passes may be formed in the first base 31. Similarly, in the second light source unit 40, a plurality of excitation light sources 42 may be disposed on an outer surface of the second base 41, and a through hole 41*c* through which the excitation light EL emitted from each excitation light source 42 toward the laser medium 20 passes may be formed in the second base 41.

The first flow path 70 may be formed in the first base 31 in a bent state (for example, in a bent state such that the first flow path 70 approaches each excitation light source 32). Similarly, the second flow path 80 may be formed in the second base 41 in a bent state (for example, in a bent state such that the second flow path 80 approaches each excitation light source 42). However, if the first flow path 70 and the second flow path 80 are formed in a straight linear shape in the first base 31 and the second base 41, respectively, the first flow path 70 and the second flow path 80 are easily formed.

The first flow path 70 may include a pipe provided independently of the main body of the first base 31 to which the plurality of excitation light sources 32 are attached.

Similarly, the second flow path 80 may include a pipe provided independently of the main body of the second base 41 to which the plurality of excitation light sources 42 are attached.

The heat sink 33*b* of the semiconductor laser element 33 may include a flow path through the coolant is introduced from the first flow path 70 and the coolant is led out to the first flow path 70. Similarly, the heat sink 43*b* of the semiconductor laser element 43 may include a flow path through the coolant is introduced from the second flow path 80 and the coolant is led out to the second flow path 80.

The first base 31 and the second base 41 may not include the first flow path 70 and the second flow path 80, respectively. In this case, each of the first base 31 and the second base 41 may be provided with radiation fins. The semiconductor laser elements 33 and 43 are cooled by the first base 31 and the second base 41 being cooled by air cooling or natural heat radiation.

Each excitation light source 32 may include an electronic cooling element for cooling the semiconductor laser element 33. Similarly, each excitation light source 42 may include an electronic cooling element for cooling the semiconductor laser element 43.

In the above embodiment, the holder 50 includes the first stopper 57 as the first regulating part configured to regulate the position of the first base 31 with respect to the holder 50, but the first base 31 may include the first regulating part, and both the first base 31 and the holder 50 may each include the first regulating part. That is, at least one of the first base 31 and the holder 50 only has to include the first regulating part configured to regulate the position of the first base 31 with respect to the holder 50. The first regulating part may be a positioning pin and a positioning hole, a positioning bolt and a positioning screw hole (in this case, they also serve to fix the first base 31 to the holder 50), or the like.

In the above embodiment, the holder 50 includes the second stopper 58 as the second regulating part configured to regulate the position of the second base 41 with respect to the holder 50, but the second base 41 may include the second regulating part, and both the second base 41 and the holder 50 may each include the second regulating part. That is, at least one of the second base 41 and the holder 50 only has to include the second regulating part configured to regulate the position of the second base 41 with respect to the holder 50. The second regulating part may be a positioning pin and a positioning hole, a positioning bolt and a positioning screw hole (in this case, they also serve to fix the second base 41 to the holder 50), or the like.

In the above embodiment, the holder 50 includes the first stopper 57 as the first regulating part configured to regulate the position of the first base 31 with respect to the holder 50, and the holder 50 includes the second stopper 58 as the second regulating part configured to regulate the position of the second base 41 with respect to the holder 50, but at least one of the first base 31 and the holder 50 may include the first regulating part configured to regulate the position of the first base 31 with respect to the holder 50, and at least one of the first base 31 and the second base 41 may include the second regulating part configured to regulate the position of the second base 41 with respect to the first base 31. In this case, the plurality of excitation light sources 32 and 42 can be easily attached to and detached from the holder 50 by simply attaching and detaching each of the first base 31 and the second base 41 to and from the holder 50. Furthermore, the plurality of excitation light sources 32 and 42 can be easily positioned with respect to the laser medium 20 by simply attaching each of the first base 31 and the second base 41 to the holder 50 supporting the laser medium 20.

As long as the holder 50 is configured to support the laser medium 20, the first light source unit 30, and the second light source unit 40, the holder 50 may not include the connecting member 53, or may not include either one of the first holding member 51 and the second holding member regardless of whether or not the connecting member 53 is included, for example. In the case in which the holder 50 is configured support the laser medium 20, the first light source unit 30, and the second light source unit 40, it is not essential that each of the laser medium 20, the first light source unit 30, and the second light source unit 40 is in contact with the holder 50. For example, the first light source unit 30 may be supported by the holder 50 in a state in which the first light source unit 30 is in contact with the holder 50, and the second light source unit 40 may be supported by the holder 50 in a state in which the second light source unit 40 is in contact with the first light source unit 30 and is spaced apart from the holder 50.

REFERENCE SIGNS LIST

1 Laser device
20 Laser medium
30 First light source unit
31 First base
32 Excitation light source
33 Semiconductor laser element
33*a* Semiconductor laser bar
40 Second light source unit
41 Second base
42 Excitation light source
43 Semiconductor laser element
43*a* Semiconductor laser bar
50 Holder
51 First holding member
52 Second holding member
53 Connecting member
55 Tubular body
56 Support surface
57 First stopper (first regulating part)
58 Second stopper (second regulating part)
70 First flow path
70*a* Upstream end
70*b* Downstream end
80 Second flow path
80*a* Upstream end
80*b* Downstream end
90 Third flow path
91 Main flow path
91*b* Flow path portion (flow path)
93 First branch flow path
93*b* Downstream end
94 Second branch flow path
94*b* Downstream end
95 Third branch flow path
95*a* Upstream end
96 Fourth branch flow path
96*a* Upstream end

The invention claimed is:

1. A laser device comprising:
a rod-shaped laser medium extending in a first direction;
a first light source unit including a first base and a plurality of excitation light sources attached to the first base;
a second light source unit arranged side by side with the first light source unit in a second direction intersecting with the first direction, the second light source unit including a second base and a plurality of excitation light sources attached to the second base; and
a holder supporting the laser medium, the first light source unit, and the second light source unit,
wherein at least one of the first base and the holder includes a first regulating part configured to regulate a position of the first base with respect to the holder,
wherein at least one of the second base and the holder includes a second regulating part configured to regulate a position of the second base with respect to the holder,
wherein the holder includes a first holding member and a second holding member arranged side by side in the first direction and a connecting member connecting the first holding member and the second holding member to each other,
wherein the first light source unit and the second light source unit are disposed between the first holding member and the second holding member, and
wherein the connecting member has a support surface supporting the first base and the second base slidably in the second direction, the support surface being in contact with the first base and the second base.

2. The laser device according to claim 1, wherein the connecting member includes a first stopper configured to restrict movement of the first base in the second direction as the first regulating part, the first stopper being in contact with the first base in the second direction, and includes a second stopper configured to restrict movement of the second base in the second direction as the second regulating part, the second stopper being in contact with the second base in the second direction.

3. The laser device according to claim 1,
wherein the first base includes a first flow path through which a coolant flows,
wherein the second base includes a second flow path through which a coolant flows, and
wherein the holder includes a third flow path through which a coolant flows.

4. The laser device according to claim 3, wherein the first flow path, the second flow path, and the third flow path communicate with each other.

5. The laser device according to claim 4,
wherein the holder includes a tubular body in which the laser medium is disposed,
wherein the tubular body has light transmittance,
wherein the third flow path includes a main flow path including a flow path between the laser medium and the tubular body, a first branch flow path and a second branch flow path branching from the main flow path, and a third branch flow path and a fourth branch flow path joining the main flow path,
wherein a downstream end of the first branch flow path is connected to an upstream end of the first flow path,
wherein a downstream end of the second branch flow path is connected to an upstream end of the second flow path,
wherein an upstream end of the third branch flow path is connected to the downstream end of the first flow path, and
wherein an upstream end of the fourth branch flow path is connected to the downstream end of the second flow path.

6. The laser device according to claim 1, wherein the plurality of excitation light sources are disposed along a circumference centered on a center line of the laser medium when viewed in the first direction.

7. The laser device according to claim 1, wherein each of the plurality of excitation light sources includes a semiconductor laser element.

8. The laser device according to claim 7, wherein the semiconductor laser element includes a plurality of stacked semiconductor laser bars.

9. A laser device comprising:

a rod-shaped laser medium extending in a first direction;

a first light source unit including a first base and a plurality of excitation light sources attached to the first base;

a second light source unit arranged side by side with the first light source unit in a second direction intersecting with the first direction, the second light source unit including a second base and a plurality of excitation light sources attached to the second base; and a holder supporting the laser medium, the first light source unit, and the second light source unit, wherein at least one of the first base and the holder includes a first regulating part configured to regulate a position of the first base with respect to the holder, wherein at least one of the first base and the second base includes a second regulating part configured to regulate a position of the second base with respect to the first base, wherein the holder includes a first holding member and a second holding member arranged side by side in the first direction and a connecting member connecting the first holding member and the second holding member to each other, wherein the first light source unit and the second light source unit are disposed between the first holding member and the second holding member, and wherein the connecting member has a support surface supporting the first base and the second base slidably in the second direction, the support surface being in contact with the first base and the second base.

10. A method for manufacturing a laser device, comprising:

a step of preparing a first light source unit including a first base and a plurality of excitation light sources attached to the first base, a second light source unit including a second base and a plurality of excitation light sources attached to the second base, and a holder supporting a rod-shaped laser medium extending in a first direction, the holder including a first holding member and a second holding member arranged side by side in the first direction and a connecting member connecting the first holding member and the second holding member to each other; and a step of sliding the first base on support surface of the connecting member from one side in a second direction intersecting with the first direction so as to dispose the first light source unit between the first holding member and the second holding member, and sliding the second base on the support surface from the other side in the second direction so as to dispose the second light source unit between the first holding member and the second holding member, and thereby arranging the first light source unit and the second light source unit side by side in the second direction.

\* \* \* \* \*